US010385900B2

(12) United States Patent
Coldwell et al.

(10) Patent No.: US 10,385,900 B2
(45) Date of Patent: Aug. 20, 2019

(54) REDUCED DIAMETER HEAD RIVET

(71) Applicant: Ford Global Technologies, LLC, Dearborn, MI (US)

(72) Inventors: David John Coldwell, Plymouth, MI (US); Amanda Kay Freis, Ann Arbor, MI (US); Garret Sankey Huff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 15/468,135

(22) Filed: Mar. 24, 2017

(65) Prior Publication Data
US 2018/0274577 A1 Sep. 27, 2018

(51) Int. Cl.
*F16B 19/08* (2006.01)
*F16B 5/04* (2006.01)

(52) U.S. Cl.
CPC ............. *F16B 19/086* (2013.01); *F16B 5/04* (2013.01); *F16B 19/08* (2013.01)

(58) Field of Classification Search
CPC .. F16B 5/04; F16B 19/00; F16B 19/04; F16B 19/086; F16B 21/00; F16B 19/08; Y10T 29/49943; Y10T 29/49956
USPC ................................................. 411/500, 501
See application file for complete search history.

(56) References Cited

U.S. PATENT DOCUMENTS

| 2,302,501 | A | * | 11/1942 | Mears | F16B 5/04 |
| | | | | | 29/509 |
| 3,200,694 | A | * | 8/1965 | Rapata | F16B 13/02 |
| | | | | | 174/153 G |
| 3,369,440 | A | * | 2/1968 | King, Jr. | F16B 19/00 |
| | | | | | 411/361 |
| 3,534,419 | A | * | 10/1970 | Putetti | B21J 15/043 |
| | | | | | 29/510 |
| 3,842,710 | A | * | 10/1974 | Poupitch | F16B 19/1027 |
| | | | | | 29/509 |
| 5,332,349 | A | | 7/1994 | Gerwin | |
| 6,263,560 | B1 | | 7/2001 | Edwards | |
| 6,663,329 | B2 | * | 12/2003 | Singh | B21J 15/025 |
| | | | | | 29/432.2 |
| 7,384,226 | B2 | * | 6/2008 | Jones | F16B 19/1054 |
| | | | | | 411/43 |
| 7,628,573 | B2 | * | 12/2009 | Philipskotter | F16B 19/086 |
| | | | | | 411/501 |
| 7,870,656 | B2 | * | 1/2011 | Eberlein | B21J 15/025 |
| | | | | | 29/525.14 |
| 9,091,290 | B2 | | 7/2015 | Singh et al. | |

(Continued)

FOREIGN PATENT DOCUMENTS

EP 2314890 4/2011

*Primary Examiner* — Roberta S Delisle
(74) *Attorney, Agent, or Firm* — Burris Law, PLLC

(57) ABSTRACT

An assembly, for example an automotive assembly, is provided that includes an upper workpiece, a lower workpiece, and a rivet extending through the upper workpiece and into the lower workpiece. The rivet, which may be a self-piercing rivet (SPR) in one form, includes a head portion and a shaft portion extending from the head portion. A diameter of the head portion ($H_d$) is less than or equal to a diameter of the shaft portion ($S_d$), and an interface between the head portion of the rivet and the upper workpiece is flush.

17 Claims, 5 Drawing Sheets

(56) References Cited

U.S. PATENT DOCUMENTS

| | | | |
|---|---|---|---|
| 9,364,885 B2 | 6/2016 | Trinick | |
| 2007/0063546 A1* | 3/2007 | Lassl | B62D 25/04 296/193.06 |
| 2010/0083481 A1* | 4/2010 | Luo | B21J 15/025 29/432 |
| 2013/0336745 A1* | 12/2013 | Trinick | F16B 5/04 411/501 |
| 2015/0375792 A1* | 12/2015 | Campbell | B62D 27/02 411/501 |
| 2016/0281757 A1 | 9/2016 | Hofmann et al. | |

* cited by examiner

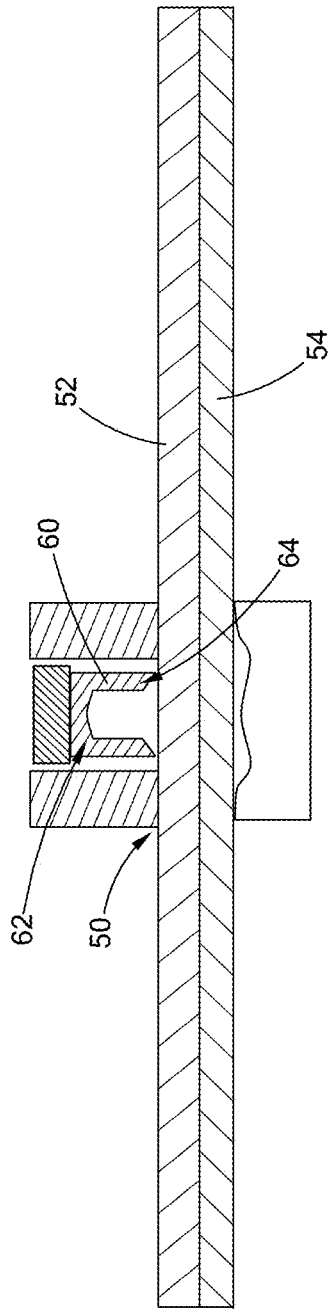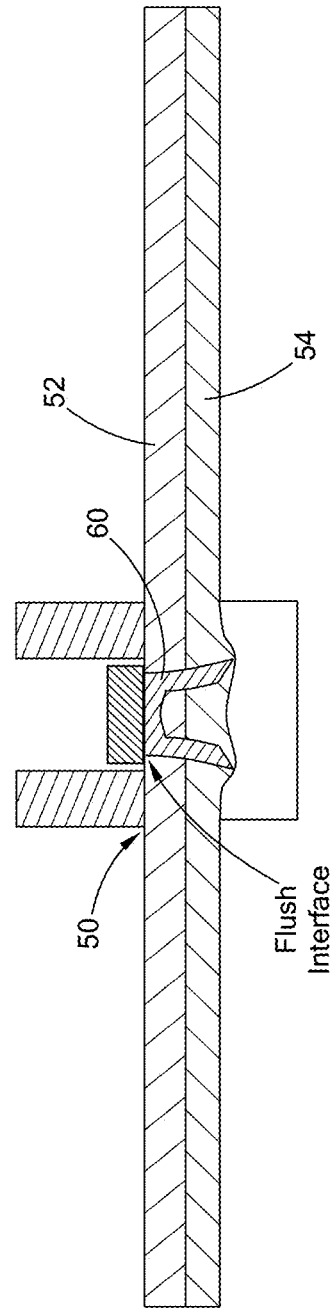

REDUCED DIAMETER HEAD RIVET

FIELD

The present disclosure relates generally to fasteners and more particularly to self-piercing rivets (SPRs).

BACKGROUND

The statements in this section merely provide background information related to the present disclosure and may not constitute prior art.

As the automotive industry continues to focus on light weighting vehicles to meet customer expectations on fuel economy and CAFE (Corporate Average Fuel Economy) requirements, interest in alternative materials including aluminum-intensive vehicle architectures has increased. In "body-in-white" structures, (a stage in which structures have been joined together before coating/painting), joining methods have traditionally relied on resistance-spot welding (e.g., in steel structures). In the case of aluminum-intensive vehicles and other mixed metal joining applications, self-piercing rivet (SPR) technology prevails. SPR technology is represented in FIG. 1, where a rivet is inserted into workpieces by a punch, and the workpieces deform into a die to form a "button."

One advantage of SPR technology is that it is a high production volume assembly process. Further, it is compatible with adhesive joining, where both the mechanical rivet and adhesive joining methods can be used together. Another advantage of SPR technology is that rivets are available in a wide variety of geometries. However, with SPR technology, high setting forces are often required to fully set the rivet into a stack. As the rivet is driven into the material, the head of the rivet comes in contact with the top material, and the setting force increases as the rivet head contacts the top material. High setting forces result in higher tool wear and maintenance requirements, and also require more robust c-frame structures to withstand the higher setting forces, compromising the sections in which they will fit for production. This is often the case when the top material is a harder material.

In addition to high setting forces, corrosion testing has shown that proud rivet head heights can cause corrosion concerns for certain applications. As shown in FIG. 2, gaps under the head of the rivet allow water and foreign objects to settle under the head, thus increasing corrosion risk. One way to resolve this issue is to reduce the flushness tolerance range, but tighter tolerances result in higher manufacturing costs.

This corrosion issue in joined assemblies using a SPRs and related friction elements/fasteners, among other mechanical joining issues, is addressed by the present disclosure.

SUMMARY

In one form of the present disclosure, a rivet is provided that comprises a head portion defining an outer diameter $H_d$ and a shaft portion extending from the head portion, the shaft portion defining an outer diameter $S_d$. $H_d$ is less than or equal to $S_d$. In various forms of this rivet, a recess extends into the shaft portion, the head portion and the shaft portion are integrally formed from the same material, or they may be different materials, the material of the rivet is selected from the group consisting of a boron steel, carbon steel, stainless steel, and aluminum, and $H_d$ is less than $S_d$ and the head portion defines a chamfer extending between the shaft portion and the head portion.

In another form, a self-piercing rivet (SPR) is provided that comprises a head portion defining an outer diameter $H_d$ and a shaft portion extending from the head portion, the shaft portion defining an outer diameter $S_d$. $H_d$ is less than $S_d$. In various forms of this SPR, the head portion defines a chamfer extending between the shaft portion and the head portion, a recess extends into the shaft portion, and the head portion and the shaft portion are integrally formed from the same material.

In still another form, an assembly is provided that comprises an upper workpiece, a lower workpiece, and a rivet extending through the upper workpiece and into the lower workpiece. The rivet comprises a head portion and a shaft portion extending from the head portion, wherein a diameter of the head portion ($H_d$) is less than or equal to a diameter of the shaft portion ($S_d$), and an interface between the head portion of the rivet and the upper workpiece is flush. In various forms of this assembly, the interface between the head portion of the rivet and the upper workpiece is designed for an increased flushness of less than +/-0.3 mm, no adhesive is used between the head portion of the rivet and the upper workpiece, the upper workpiece comprises a material having a hardness greater than a hardness of the lower workpiece, the upper workpiece is selected from the group consisting of high strength and ultra high strength steels, aluminum, composite, mild steel, and magnesium, the lower workpiece is selected from the group consisting of aluminum and steel, a recess extends into the shaft portion of the rivet, $H_d$ is less than $S_d$ and the head portion defines a chamfer extending between the shaft portion and the head portion, the head portion and the shaft portion are integrally formed from the same material, the material of the rivet is selected from the group consisting of a boron steel, carbon steel, stainless steel, and aluminum. A motor vehicle is also contemplated, which comprises the fasteners and assemblies illustrated and described herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5A is a cross-sectional view of an assembly and a rivet prior to installation and constructed in accordance with the teachings of the present disclosure; and FIG. 5B is a cross-sectional view of an assembly and a rivet after installation and constructed in accordance with the teachings of the present disclosure.

Figure 1:
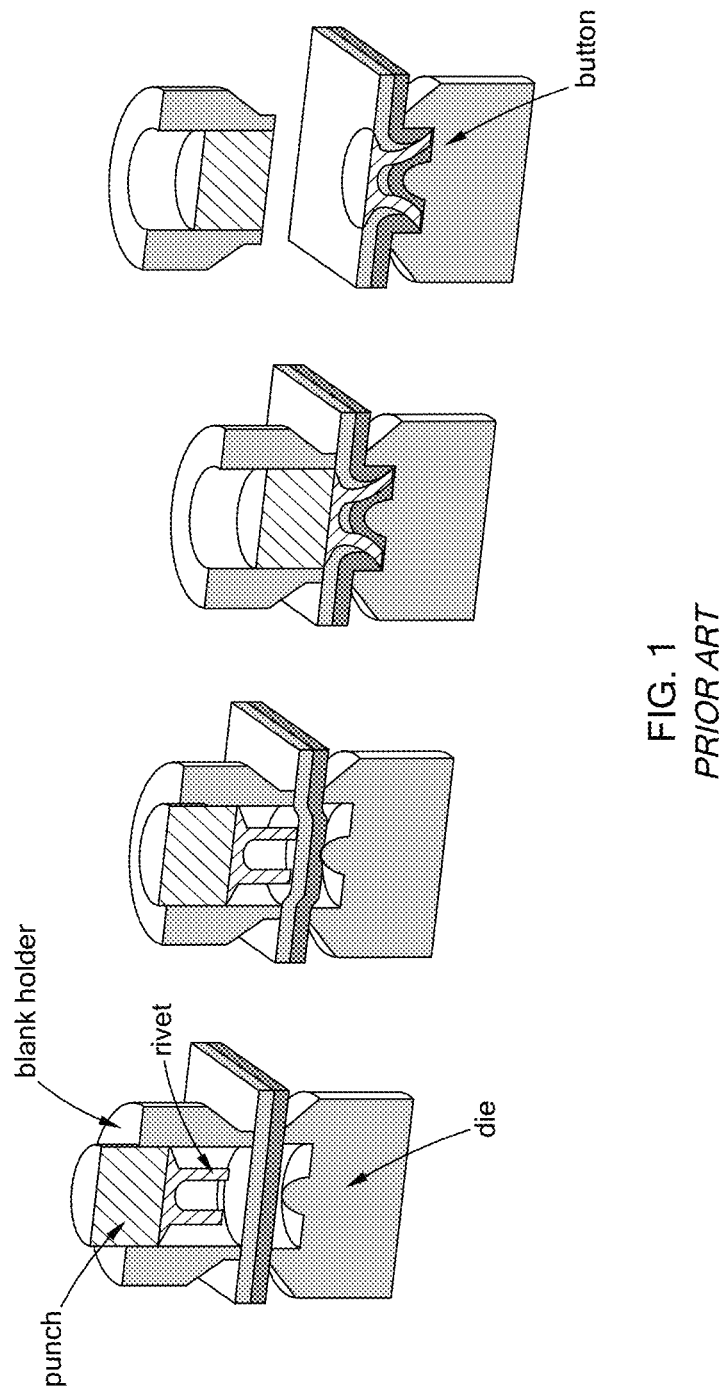
FIG. 1 is a series of progressive cross-sectional views illustrating a self-piercing rivet (SPR) installation according to the prior art.
Figure 2:
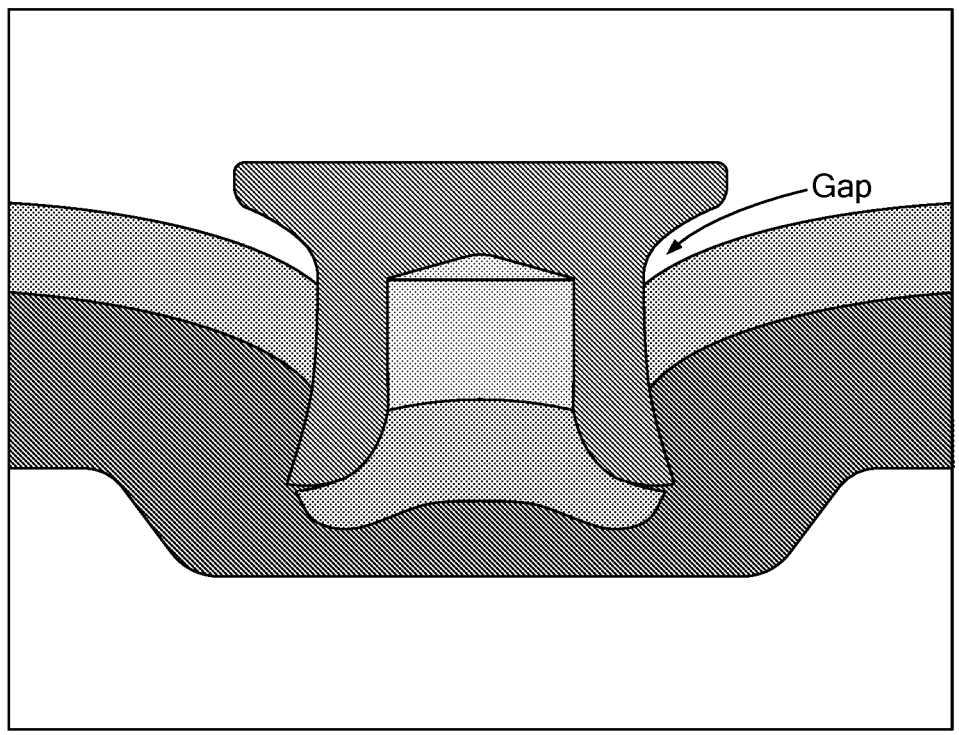
FIG. 2 is a cross-sectional view of an installed SPR according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3B:
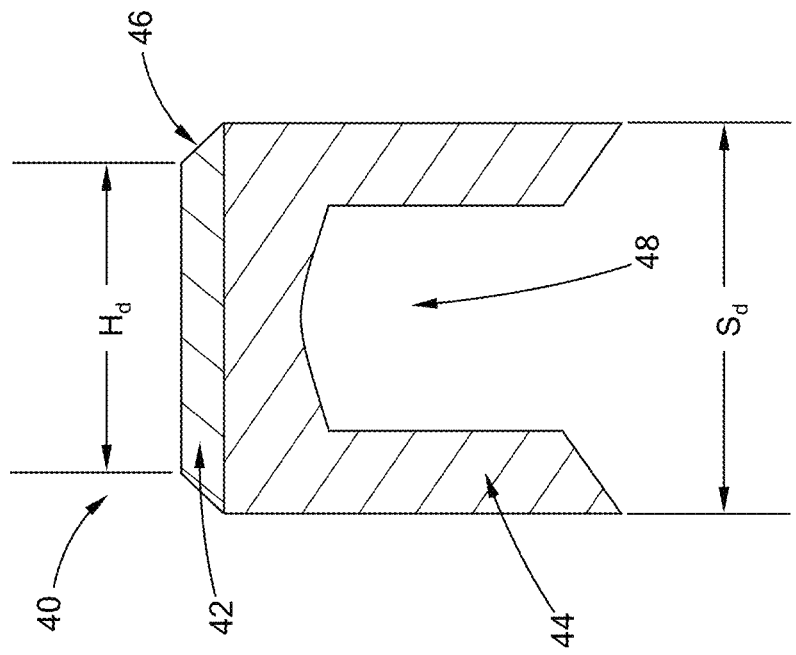
FIG. 3B is a cross-sectional view of another form of a rivet constructed in accordance with the teachings of the present disclosure.
Figure 3A:
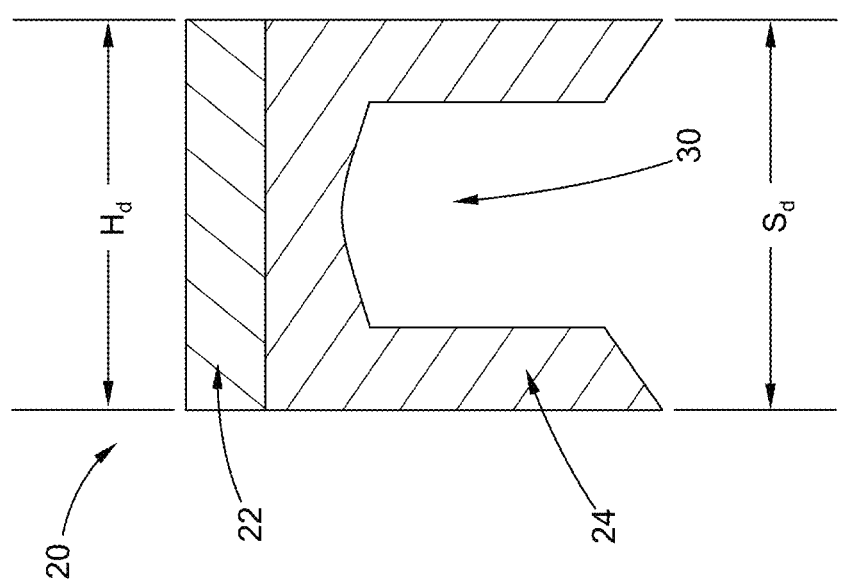
FIG. 3A is a cross-sectional view of a rivet constructed in accordance with the teachings of the present disclosure.

Referring to FIG. 3A, a rivet constructed according to the teachings of the present disclosure is illustrated and generally indicated by reference numeral 20. The rivet 20 comprises a head portion 22 defining an outer diameter $H_d$ and a shaft portion 24 extending from the head portion 22, the shaft portion 24 defining an outer diameter $S_d$. The outer diameter $H_d$ of the head portion 22 is less than or equal to an outer diameter $S_d$ of the shaft portion 24. The outer diameter $H_d$ of the head portion 22 of the rivet 20 is smaller in order to reduce any gap that may exist under or near the head portion 22 after installation as described in greater detail below.

Figure 4:
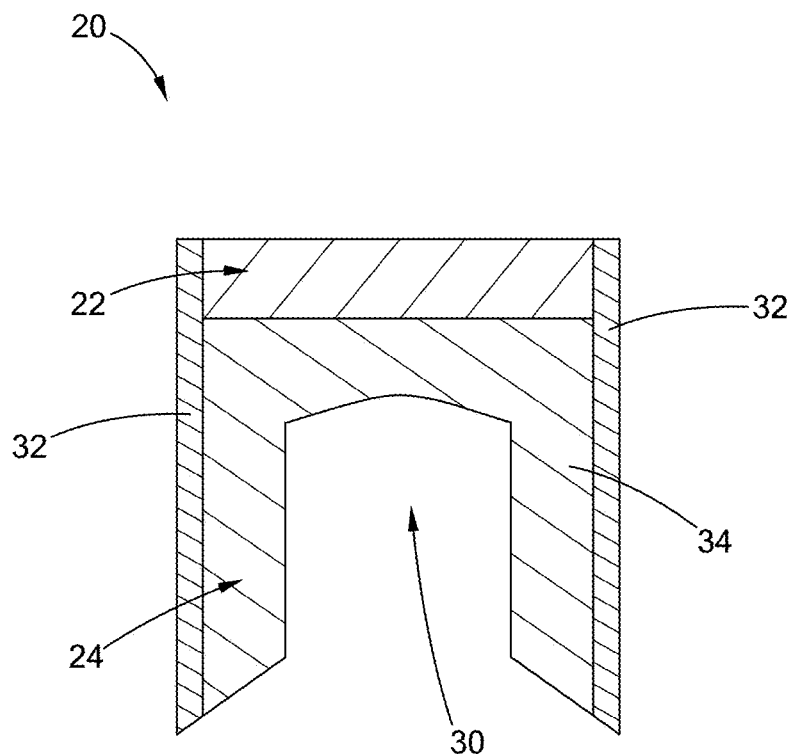
FIG. 4 is a cross-sectional view of another form of a rivet constructed in accordance with the teachings of the present disclosure.

As further shown, a recess 30 extends into the shaft portion 24 in one form of the rivet 20. The recess 30 accommodates the deformation of workpieces that are joined together with the rivet 20, as described in greater detail below. In one form, the head portion 22 and the shaft portion 24 are integrally formed from the same material. However, in other forms, the head portion 22 and the shaft portion 24 may consist of different materials. Referring to FIG. 4, one such variation is shown that includes an outer shell 32 and an inner column 34. The outer shell 32 of the shaft portion 24 (which may also extend into the head portion 22 as shown) is a softer material than the inner column 34 of the shaft portion 24 (which may also extend into the head portion 22) for ease of installation. Although the rivet 20 may be any material, in one form the material is boron steel, and in other forms, carbon steel, stainless steel, and aluminum may be used. It should be understood that these materials are only exemplary and should not be construed as limiting the scope of the present disclosure.

Referring now to FIG. 3B, another form of a rivet constructed according to the teachings of the present disclosure is illustrated and generally indicated by reference numeral 40. In this form, the outer diameter $H_d$ of a head portion 42 is less than the outer diameter $S_d$ of a shaft portion 44, and the head portion 42 defines a chamfer 46 extending around the head portion 42 and between the shaft portion 44 and the head portion 42. Similar to rivet 20, this rivet 40 includes a recess 48 and may be formed of a number of materials as set forth herein. Further, the head portion 42 and the shaft portion 44 are integrally formed from the same material. However, in other forms, the head portion 42 and the shaft portion 44 may be different materials. In either of the forms shown in FIGS. 3A and 3B, the rivet 20/40 may be a self-piercing rivet (SPR), among other types of rivets/fasteners.

Referring to FIGS. 5A and 5B, an assembly according to the teachings of the present disclosure is illustrated and generally indicated by reference numeral 50. The assembly 50 comprises an upper workpiece 52, a lower workpiece 54, and a rivet 60 extending through the upper workpiece 52 and into the lower workpiece 54. The rivet 60 may be either of the forms shown above (20/40) where a diameter of the head portion ($H_d$) is less than or equal to a diameter of the shaft portion ($S_d$), among the other features and materials set forth above. After installation, due to the geometric configuration of a head portion 62 relative to a shaft portion 64, an interface between the head portion 62 of the rivet 60 and the upper workpiece 52 is flush. In other words, no gap or space exists under the head portion 62 that can be a source of corrosion. with the diameter $H_d$ of the head portion 62 being smaller than a conventional rivet, namely, the diameter $H_d$ of the head portion 62 being less than or equal to the diameter $S_d$ of the shaft portion 64, one skilled in the art would expect an insufficient grip strength. However, the inventors have discovered that with the installation method of such a rivet 60, for example an SPR or a method that plastically deforms the rivet and workpieces, sufficient grip strength can be provided with the diameter $H_d$ of the head portion 62 being less than or equal to the diameter $S_d$ of the shaft portion 64, while improving corrosion resistance of the assembly.

With the rivet configuration/geometry as described herein, the interface between the head portion 62 of the rivet 60 and the upper workpiece 52 is designed for an increased flushness tolerance of less than +/−0.3 mm, which contributes to reduced manufacturing costs.

In some applications, the upper workpiece 52 comprises a material having a hardness greater than a hardness of the lower workpiece 54. The upper workpiece 52 may be a material selected from the group consisting of high strength and ultra high strength steels, aluminum, composite, mild steel, and magnesium. The lower workpiece 54 may be a material selected from the group consisting of aluminum and steel.

The present disclosure also contemplates a motor vehicle comprising the assembly 50 and variations thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A self-piercing rivet comprising:
   a head portion defining an outer diameter $H_d$;
   a shaft portion extending from the head portion, the shaft portion defining an outer diameter $S_d$;
   a recess extending into the shaft portion; and
   a tapered distal end portion,
   wherein $H_d$ is less than or equal to $S_d$, and after installation, an interface between the head portion and a workpiece is flush and the tapered distal end portion is plastically deformed outwards.

2. The self-piercing rivet according to claim 1, wherein the head portion and the shaft portion are integrally formed from the same material.

3. The self-piercing rivet according to claim 2, wherein the material of the self-piercing rivet is selected from the group consisting of a boron steel, carbon steel, stainless steel, and aluminum.

4. The self-piercing rivet according to claim 1, wherein $H_d$ is less than $S_d$ and the head portion defines a chamfer extending between the shaft portion and the head portion.

5. The self-piercing rivet according to claim 1, wherein at least the shaft portion comprises an outer shell extending around an inner column, and the outer shell comprises a material that is softer than a material of the inner column.

6. A self-piercing rivet comprising:
a head portion defining an outer diameter $H_d$;
a shaft portion extending from the head portion, the shaft portion defining an outer diameter $S_d$;
a recess extending into the shaft portion; and
a tapered distal end portion,
wherein $H_d$ is less than $S_d$, and after installation, an interface between the head portion and a workpiece is flush and the tapered distal end portion is plastically deformed outwards.

7. The self-piercing rivet according to claim 6, wherein the head portion defines a chamfer extending between the shaft portion and the head portion.

8. The self-piercing rivet according to claim 6, wherein the head portion and the shaft portion are integrally formed from the same material.

9. An assembly comprising:
an upper workpiece;
a lower workpiece; and
a self-piercing rivet extending through the upper workpiece and into the lower workpiece, the self-piercing rivet comprising:
a head portion;
a shaft portion extending from the head portion;
a recess extending into the shaft portion; and
a tapered distal end portion,
wherein a diameter of the head portion ($H_d$) is less than or equal to a diameter of the shaft portion ($S_d$), and an interface between the head portion of the self-piercing rivet and the upper workpiece is flush, and the tapered distal end portion is plastically deformed outwards.

10. The assembly according to claim 9, wherein the interface between the head portion of the self-piercing rivet and the upper workpiece is designed for an increased flushness of less than +/−0.3 mm.

11. The assembly according to claim 9, wherein the upper workpiece comprises a material having a hardness greater than a hardness of the lower workpiece.

12. The assembly according to claim 9, wherein the upper workpiece is a material selected from the group consisting of high strength steel, ultra high strength steel, aluminum, composite, mild steel, and magnesium.

13. The assembly according to claim 9, wherein the lower workpiece is a material selected from the group consisting of aluminum and steel.

14. The assembly according to claim 9, wherein $H_d$ is less than $S_d$ and the head portion defines a chamfer extending between the shaft portion and the head portion.

15. The assembly according to claim 9, wherein the head portion and the shaft portion are integrally formed from the same material.

16. The assembly according to claim 9, wherein the material of the self-piercing rivet is selected from the group consisting of a boron steel, carbon steel, stainless steel, and aluminum.

17. A motor vehicle comprising the assembly according to claim 9.

* * * * *